United States Patent Office 3,085,374
Patented Apr. 16, 1963

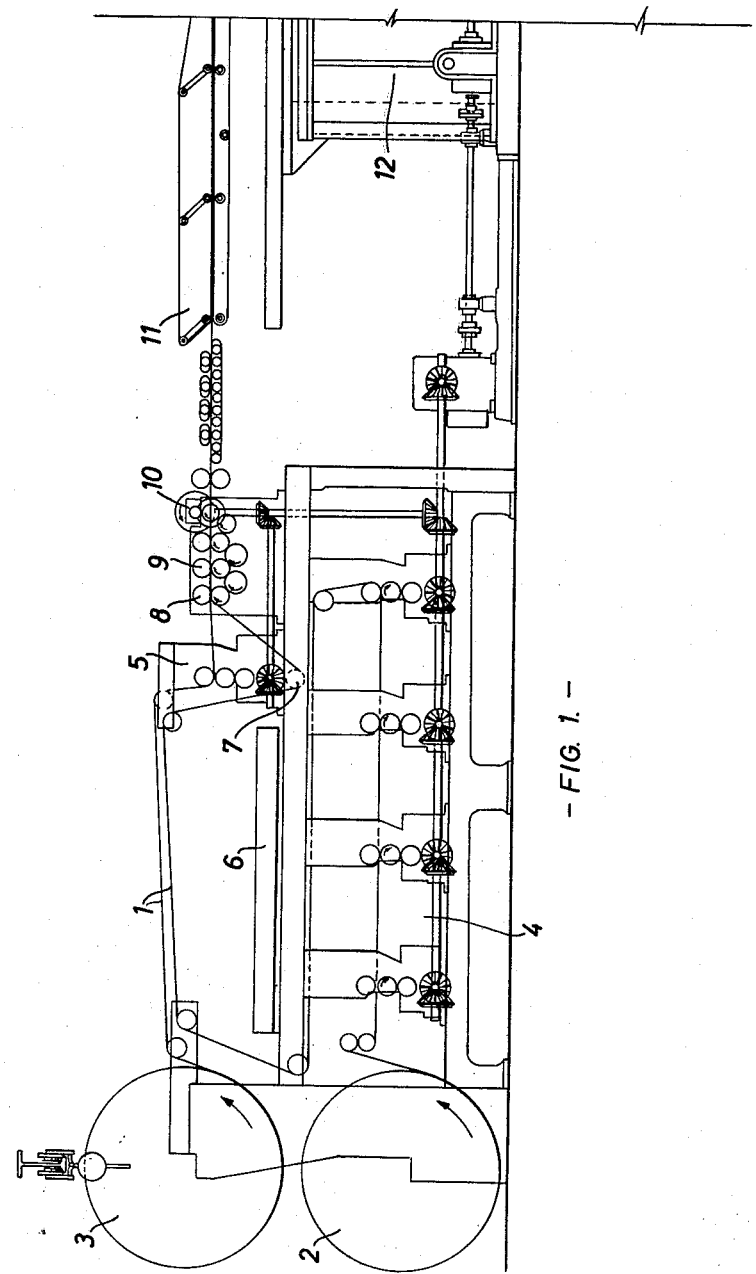

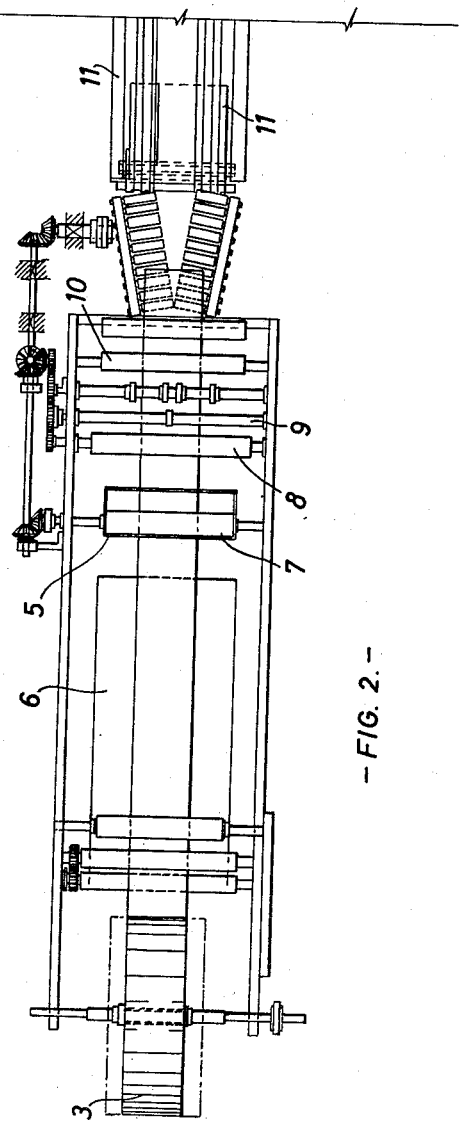

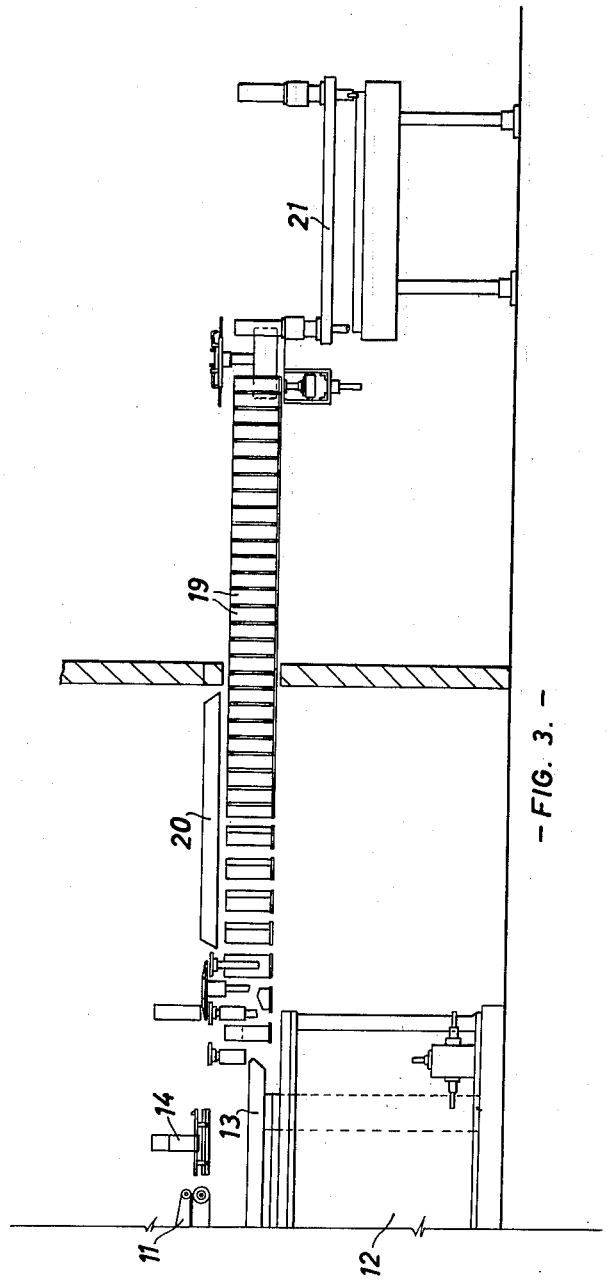

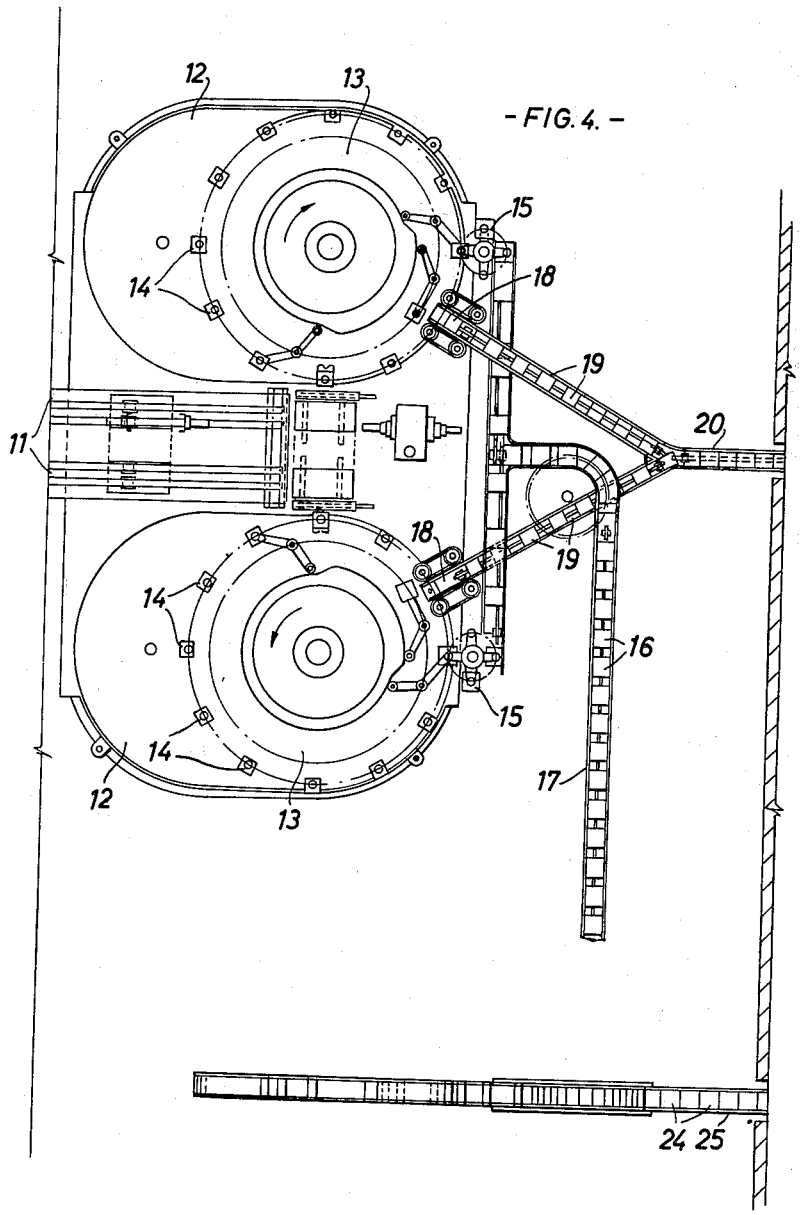

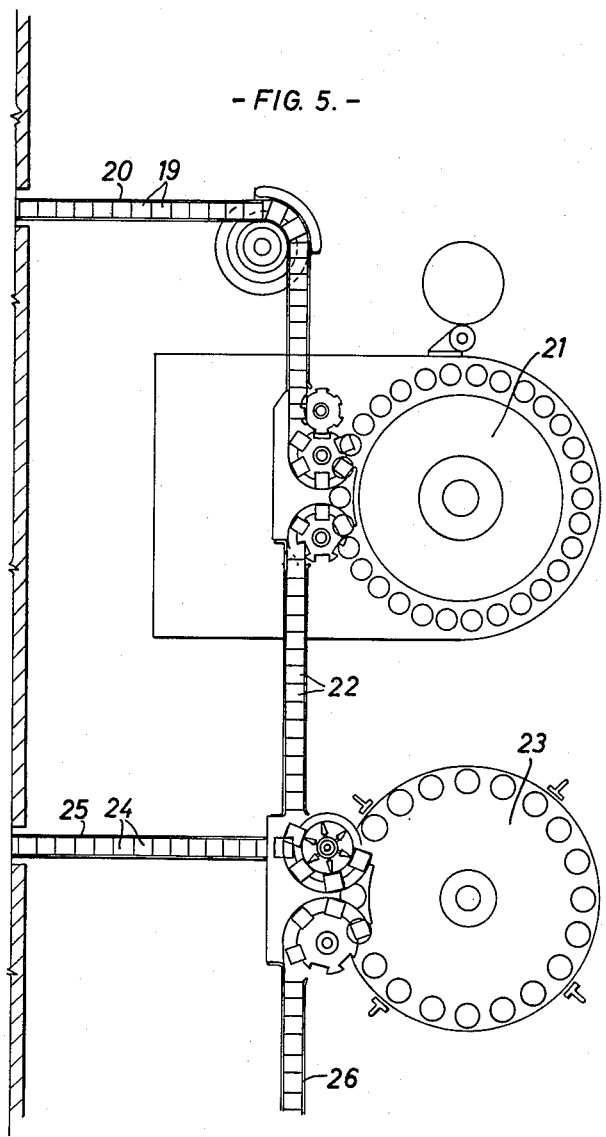

3,085,374
METHOD OF AND APPARATUS FOR FORMING
AND FILLING CARTONS
Edward John Everard Powell, 42 Palace Road,
London SW. 2, England
Filed Dec. 5, 1960, Ser. No. 73,568
1 Claim. (Cl. 53—29)

This invention relates to the method of and apparatus for forming and filling cartons and has for its object to provide a method of and means whereby cartons can be formed from the reel and produced filled with solid or liquid contents such as milk or other liquids or beverages or solids, dry goods or granules.

According to the invention the method of forming and filling cartons comprises feeding heat-sealable, paper stock material to a blank cutting unit, presenting the blanks to a body forming machine having formers around which the bodies are formed and their longitudinal seams heat sealed, tops of similar heat sealable, paper stock material being embossed and pre-scored and then fitting the top blanks to the body forming machine which applies and heat seals the tops to the bodies, said carton bodies being sterilized under ultraviolet light with open end up and then passed by conveyor to a filling machine and thence to a capping machine which receives the bottoms either as individual blanks, said bottoms being of similar material and similarly treated as the tops, said capping machine applying the bottoms and heat sealing them to the filled bodies.

The material may be passed over an electronically registered cutter and/or slitting knife or its equivalent after leaving the printing and/or laminating machine and each length of material diverted to pass down its own conveyor to a body forming machine and the formed bodies with their tops applied passed from the body forming machine or machines to a conveyor which leads to the filling machine. The tops will be fed to each body forming machine at the required rate by conveyor means and suction or gripper "pick-up."

The body forming machine may comprise one or more body forming mandrel assemblies which may be driven by either intermittent or constant motion operation and the machine may be of the turret or endless chain type. For intermittent motion, blank feeds may be from intermittently stationary location, but for constant rotation blank feeding must be by mobile presentation, with speed of travel being timed to conform at all times with the peripheral speed of the pick up means of the body former. Such presentation may conveniently be by moving conveyors. The machine or machines may operate in either the horizontal or vertical plane.

In order that the invention may be fully comprehended the same will now be described in its simplest form with reference to and by the aid of the accompanying drawings, wherein:

FIGURE 1 is a diagrammatic side elevation showing the printing, laminating and blanking portion of a suitable machine.

FIGURE 2 is a plan of FIGURE 1.

FIGURE 3 is a diagrammatic side elevation showing the carton forming and filling arrangements.

FIGURE 4 is a plan view of the carton forming portion of FIGURE 3.

FIGURE 5 is a diagrammatic plan view of the filling and capping machines.

Referring to the drawings, white or similar cartridge paper 1 board from two rolls 2, 3 is fed through a printing unit 4 and laminating machine 5 in which the board from one roll 2 is printed and dried at 6 and then the two layers laminated by means of thermoplastic adhesive coated by means of rollers 7 on one or both sides of one of the layers and then both layers are passed through squeeze rollers 8. The laminated sheet is then slit longitudinally at 9 and each divided length is passed through a blank cutting or stamping machine 10 which cuts the board into the body blanks, which then pass along a belt conveyor 11 between upper and lower tapes to the respective body forming machines 12.

In an alternative embodiment (not shown) the commencement of the body-forming operation can be effected from a single reel of paperboard, which, in this case comes from the paper-mill, already laminated or treated.

Alternatively a plain paper can be used and the carton subsequently sprayed or dipped or otherwise treated.

Each body forming machine 12 comprises a rotating table 13 which carried a plurality of body former heads 14 e.g. 12 consisting of rectangular heated blocks around each of which a blank is folded by means of presser members which folds the blanks around the sides of the body former, and heat seals the longitudinal seam of the body whilst the table is being rotated. Such a machine is described in our copending application for patent. The heated blocks cause the plasticising of the thermoplastic centre laminate and thus permit a sliding action of one paper ply against the other resulting in a permanent "set" to the carton board on the radiused corners. In the case of impregnated material the additives being also of a thermoplastic nature, also induce a permanent "set" on cooling after forming. The presser members are operated by means of bell crank levers, followers and cams, the latter being stationary and the bell cranks and followers being carried round with the table. At a point 15 after that at which the longitudinal seam is clamped; precreased and heat seal coated tops 16 in blank form are fed by conveyors 17 from a suitable blank cutting or stamping machine (not shown) to each body forming machine 12 and the tops are applied and heat sealed to the lower end of the carton body by means of cupped dies which accept the pressure of internal expanding mandrels carried on the lower ends of the body-forming mandrel, as described in our co-pending application. After the sealing of the lid the carton is moved to a discharge point 18 when it is removed from the body former and the lidded carton 19 passes to an ultra-violet-irradiated conveyor 20 which feeds the cartons to a filling machine 21 of suitable type such for example as an ALBRO Filler. After leaving the filler 21 the fill cartons 22 are passed to a capping machine 23 which inserts and heat seals the bottoms 24 of the cartons fed by conveyors 25 from the aforesaid blank cutting or stamping machine (not shown) into the upper ends of the cartons 22 by means of suitable external supporting members and expanding mandrels which engage the sides of the recessed bottoms and the body of the carton. The filled and sealed cartons are delivered by the conveyor 26 to a suitable discharge point.

In an alternative arrangement, instead of end closures being conveyed to the body forming and capping machines by conveyor in blank form, they may be presented in reeled form pre-printed and pre-glued and cut into blank form at or adjacent to the body forming and capping machine respectively.

In a similar way, the pre-printed and pre-glued material for the bodies of the cartons may be presented in reeled form to the body formers and cut into blank form at or adjacent to said body forming machine or machines.

It will be seen that the present invention provides a process and apparatus for the production of filled and sealed cartons from rolls of board which can be operated substantially automatically and continuously.

What I claim is:

A method of forming and filling liquid-tight cartons by continuous and uninterrupted series of operations comprising continuously feeding heat-sealable paper stock material in the form of cut blanks from a blank cutting station; forming each of said blanks about a body former, successively into tubular body units having permanently set radiused corners by heat-sealing the longitudinal edges of said blank while on the body former to form a longitudinal seam and pressing said radiused corners; embossing and scoring another blank of the same kind of heat-sealable paper stock to form a flanged top which fits over one end of the tubular body, said top blank being scored at one corner and along the flanges to form a tearing corner; positioning and folding one of said tops to the corresponding blank in overlapping relation; heat-sealing said top to said tube by the heat and pressing action of heat-sealing cupped dies over the tops and around the sides of said flanged tops while bearing against an internally expanding mandrel within said blank to bring the corners of said top flanges into smooth and tight bearing adhered relation to the radiused corners of said body; filling said container with liquid with the open end of the container in upright position; thereafter inserting a recessed bottom closure to the top open end of the filled container and heat-sealing said bottom closure with heat-sealing means engaging the sides of said recessed bottom closure and the body of the filled carton to provide a filled completely sealed container in inverted position.

References Cited in the file of this patent
UNITED STATES PATENTS

| | | |
|---|---|---|
| 2,697,313 | Wilcox | Dec. 21, 1954 |
| 2,767,533 | Lange | Oct. 23, 1956 |
| 2,811,000 | Baker-Carr | Oct. 29, 1957 |
| 2,923,111 | Selock | Feb. 21, 1960 |